(12) United States Patent
Levin et al.

(10) Patent No.: US 9,360,940 B2
(45) Date of Patent: Jun. 7, 2016

(54) MULTI-PANE INTERFACE

(75) Inventors: Noah Levin, San Francisco, CA (US); Daniel E. Fish, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 13/455,215

(22) Filed: Apr. 25, 2012

(65) Prior Publication Data
US 2013/0125047 A1 May 16, 2013

Related U.S. Application Data (60) Provisional application No. 61/559,261, filed on Nov. 14, 2011.

(51) Int. Cl.
*G06F 3/048* (2013.01)
*G06F 3/01* (2006.01)
*G06F 3/0488* (2013.01)
*G06F 3/0354* (2013.01)

(52) U.S. Cl.
CPC .............. *G06F 3/017* (2013.01); *G06F 3/0488* (2013.01); *G06F 3/03548* (2013.01); *G06F 2203/04803* (2013.01); *G06F 2207/729* (2013.01)

(58) Field of Classification Search
CPC ............... G06F 2203/04803; G06F 3/0488; G06F 3/017; G06F 2207/729; G06F 3/03548
USPC .............. 715/790, 792, 794, 863, 277, 273
See application file for complete search history.

(56) References Cited

U.S. PATENT DOCUMENTS

| | | | | |
|---|---|---|---|---|
| 7,664,770 B2* | 2/2010 | Jackson | ............ | G06F 17/30864 707/706 |
| 7,873,622 B1* | 1/2011 | Karls | ................ | G06F 17/30864 707/707 |
| 7,934,161 B1* | 4/2011 | Denise | .............. | G06F 17/30864 707/706 |
| 8,082,516 B2* | 12/2011 | Vaca | ................. | G06F 17/30864 707/707 |
| 8,255,827 B2* | 8/2012 | Malik | ..................... | G06F 3/013 715/788 |
| 2001/0028365 A1* | 10/2001 | Ludolph | ............... | G06F 3/0481 715/764 |
| 2002/0135602 A1* | 9/2002 | Davis | .................... | G06F 3/0485 345/684 |
| 2002/0198906 A1* | 12/2002 | Press | ..................... | G06F 3/0481 715/212 |
| 2004/0008224 A1* | 1/2004 | Molander | ............. | G06F 3/0481 715/764 |
| 2005/0060664 A1* | 3/2005 | Rogers | .................. | G06F 3/0481 715/810 |
| 2006/0055662 A1* | 3/2006 | Rimas-Ribikauskas | | G06F 3/017 345/156 |
| 2006/0224951 A1* | 10/2006 | Burke | ............... | G06F 17/30899 715/234 |

(Continued)

OTHER PUBLICATIONS

Notification of Transmittal of the International Search Report and the Written Opinion of the International Searching Authority; Young, Lee W.; Jan. 22, 2013; World Intellectual Property Organization (WIPO) (International Bureau of); PCT/US1262525; 13.

*Primary Examiner* — Ajay Bhatia
*Assistant Examiner* — Jennifer Nichols
(74) *Attorney, Agent, or Firm* — Fish & Richardson P.C.

(57) ABSTRACT

Methods, systems, and apparatus, including computer programs encoded on a computer storage medium, for presenting content. In one aspect, a method includes determining that user interaction with a search result has occurred, where the search result was presented in a results pane of a display. A browsing pane is generated in which a landing page for the search result is presented. The browsing pane is presented over a portion of the results pane. The portion of the results pane is bounded by an edge of the display and a pane edge of the browsing pane, where the pane edge is located at an initial display location. A user swipe is determined to have occurred, and in response to the user swipe the pane edge is relocated to a target display location.

27 Claims, 7 Drawing Sheets

(56) References Cited

U.S. PATENT DOCUMENTS

| | | | |
|---|---|---|---|
| 2008/0133487 A1* | 6/2008 | Gross | G06F 17/30864 |
| 2008/0168404 A1* | 7/2008 | Ording | G06F 3/0485 715/863 |
| 2009/0013282 A1* | 1/2009 | Mercer | G06F 3/0481 715/788 |
| 2009/0199128 A1* | 8/2009 | Matthews | G06F 3/0481 715/799 |
| 2009/0234811 A1* | 9/2009 | Jamil | G06F 17/30867 |
| 2009/0241059 A1* | 9/2009 | Moore | G06F 3/0481 715/800 |
| 2009/0307631 A1* | 12/2009 | Kim | G06F 3/04883 715/830 |
| 2010/0110034 A1* | 5/2010 | Teng | G06F 3/04883 345/173 |
| 2010/0146012 A1* | 6/2010 | Beaudreau | G06F 17/30648 707/803 |
| 2010/0182248 A1* | 7/2010 | Chun | G06F 3/041 345/173 |
| 2010/0302172 A1* | 12/2010 | Wilairat | G06F 3/04883 345/173 |
| 2011/0022957 A1* | 1/2011 | Lee | G06F 3/0485 715/702 |
| 2011/0074699 A1* | 3/2011 | Marr | G06F 3/0485 345/173 |
| 2011/0175930 A1* | 7/2011 | Hwang | G06F 3/0481 345/629 |
| 2011/0181526 A1* | 7/2011 | Shaffer | G06F 9/4443 345/173 |
| 2011/0185316 A1* | 7/2011 | Reid | G06F 3/04883 715/863 |
| 2011/0246904 A1 | 10/2011 | Pinto et al. | |
| 2011/0296334 A1* | 12/2011 | Ryu | G06F 3/0483 715/776 |
| 2012/0054674 A1* | 3/2012 | Beykpour | G06F 3/0481 715/788 |
| 2012/0062604 A1* | 3/2012 | Lobo | G06F 3/04883 345/684 |
| 2012/0098766 A1* | 4/2012 | Dippel | G06F 3/0416 345/173 |
| 2012/0144331 A1* | 6/2012 | Tolonen | G06F 3/0484 715/769 |
| 2012/0174005 A1* | 7/2012 | Deutsch | G06F 3/04817 715/764 |
| 2012/0180001 A1* | 7/2012 | Griffin | G06F 3/04883 715/863 |
| 2012/0192056 A1* | 7/2012 | Migos | G06F 17/241 715/230 |
| 2012/0197857 A1* | 8/2012 | Huang | G06F 3/0488 707/706 |
| 2012/0204125 A1* | 8/2012 | Shia | G06F 3/0488 715/773 |
| 2012/0235902 A1* | 9/2012 | Eisenhardt | A42B 3/042 345/156 |
| 2012/0236037 A1* | 9/2012 | Lessing | G06F 3/017 345/661 |
| 2012/0278757 A1* | 11/2012 | Shah | G06F 9/4443 715/790 |
| 2012/0304107 A1* | 11/2012 | Nan | G06F 3/04886 715/781 |
| 2013/0057400 A1* | 3/2013 | Dehmann | B60K 37/06 340/441 |
| 2013/0067421 A1* | 3/2013 | Osman | G06F 3/0481 715/863 |
| 2013/0120279 A1* | 5/2013 | Plichta | G06F 3/04883 345/173 |
| 2013/0124511 A1* | 5/2013 | Levin | G06F 17/30696 707/723 |
| 2013/0145290 A1* | 6/2013 | Weber | G06F 3/04883 715/760 |

* cited by examiner

MULTI-PANE INTERFACE

CROSS-REFERENCE TO RELATED APPLICATIONS

This application claims the benefit under 35 U.S.C. §119 (e) of U.S. Patent Application No. 61/559,261, entitled "MULTI-PANE INTERFACE," filed Nov. 14, 2011, which is incorporated herein by reference in its entirety.

BACKGROUND

This specification relates to data presentation.

The Internet provides access to a wide variety of resources such as images, video or audio files, web pages for particular subjects, book articles, or news articles. A search system can identify resources that are responsive to a search query and provide search results that reference the identified resources. Users can view the search results on a display device and request presentation of the resources through interaction with the search results. For example, in response to user interaction with a search result, the resource that is referenced by the search result can be presented in the display in which the search result was presented.

SUMMARY

In general, one innovative aspect of the subject matter described in this specification can be embodied in methods that include the actions of determining that user interaction with a search result has occurred, the search result with which the user interacted having been presented in a results pane of a display; generating a browsing pane in which a landing page for the search result is presented, the browsing pane being presented over a portion of the results pane, the portion of the results pane being bounded by an edge of the display and a pane edge of the browsing pane, the pane edge being located at an initial display location; determining that a user swipe has occurred, the determination that the user swipe has occurred being based, at least in part, on detection of a pointer at multiple locations along a path that extends from a first display location to a second display location, the first display location being within a threshold distance of the initial display location; relocating the pane edge to a target display location, the relocation causing the portion of the results pane over which the browsing pane is presented to be adjusted. Other embodiments of this aspect include corresponding systems, apparatus, and computer programs, configured to perform the actions of the methods, encoded on computer storage devices.

These and other embodiments can each optionally include one or more of the following features. Methods can further include the action of detecting, while the browsing pane is presented over the portion of the results pane, an additional user interaction with an additional search result that is presented in the results pane. In response to detecting the additional user interaction: presentation of the browsing pane can be maintained over the portion of the results pane; and a landing page for the additional search result can be presented in the browsing pane.

Methods can further include the action of determining that user interaction with a resource link occurred, the resource link being a link that is included in the landing page for the additional search result. In response to determining that the user interaction with the resource link occurred a resource that is referenced by the resource link can be requested; and the resource can be presented in the browsing pane. The resource can be presented while maintaining presentation of at least one search result in the results pane.

Methods can further include the actions of determining a direction of the user swipe, the direction of the user swipe being based on sequential detection of the pointer at two or more of the multiple points; and selecting the target display location based, at least in part, on the initial display location and the direction of the user swipe. Methods can further include the actions of determining a speed of the user swipe, the speed of the user swipe being based on an amount of time between detection of the pointer at two or more of the multiple points, wherein the target display location is further selected based, at least in part, on the speed of the user swipe. A distance between the target display location and the initial display location can be proportional to the speed of the user swipe.

Selecting the target display location can include selecting the target display location from a plurality of candidate display locations. The plurality of candidate display locations can include at least a results view display location that is located at a first edge of the display and causes less than a threshold portion of the results pane to be occluded by the browsing pane; a browsing view display location that is located at a second edge of the display and causes more than a threshold portion of the results pane to be occluded by the browsing pane, the second edge being located on an opposite end of the display than the first edge; and a partial view display location that is located between the first edge and the second edge.

Methods can further include the actions of determining that the pane edge is located at the results view display location; determining that a browsing view condition has been satisfied, the determination that the browsing view condition is satisfied being based, at least in part, on the direction of the user swipe being towards the second edge of the display and that the speed of the user swipe being greater than a speed threshold; and in response to determining that the browsing view condition has been satisfied, relocating the pane edge to the browsing view display location.

Methods can further include the actions of determining that a subsequent user swipe has occurred while the pane edge is located at the browsing view display location; determining that the subsequent user swipe satisfies a results view condition, the determination that the results view condition is satisfied being based, at least in part, on the direction of a subsequent user swipe being toward the results view display location and the speed of the subsequent user swipe being greater than the speed threshold; and in response to determining that the results view condition has been satisfied, relocating the pane edge to the results view display location.

Particular embodiments of the subject matter described in this specification can be implemented so as to realize one or more of the following advantages. Users are enabled to view landing pages for search results without navigating away from a search results page. A landing page for a search result can be presented in a separate pane than the search result, thereby enabling a user to explore the landing page, as well as pages that are linked to by the landing page, while maintaining presentation of the search results. Users can select a portion of a display that is occupied by each pane based on the direction and speed with which the user swipes a pointer across the display. Each pane can maintain the content that is presented in the pane irrespective of the portion of the pane that is presented on the display.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The availability of portable computing devices is increasing, and many of these devices have touch screens that enable a user to use a finger or another pointer to interact with content. For example, users using a tablet computing device can enter interact with a search result by touching a location of the touch screen at which the search result is presented. The user interaction with the search result initiates a request for a resource that is referenced by the search result, and the resource can be presented in the browser (or other application) that is operating on the computing device.

To increase usability of tablet devices in search and/or non-search environments, a multi-pane user interface can be implemented that enables presentation of search results in one pane (i.e., a "results pane") and presentation of other content in a second pane (i.e., "a browsing pane"). In some implementations, the browsing pane is presented in response to user interaction with a search result, and a portion of the browsing pane is presented at a location that occludes a portion of the results pane.

The location at which the browsing pane is initially presented can be selected so that the search results that were being presented in the results pane and at least a portion of the content for the resource that is presented in the browsing pane are visible. This enables sequential selection of search results and examination of the resources that are referenced by the search results in separate portions of the user device display. In some implementations, user interaction with either the search results or the content presented in the browsing pane will not affect the size and/or orientation of the results pane or the browsing pane. As discussed in more detail below, the portion of the browsing pane that is presented, and in turn, the portion of the results pane that is occluded can be adjusted through user interactions with a pane edge of the browsing pane.

Figure 1:
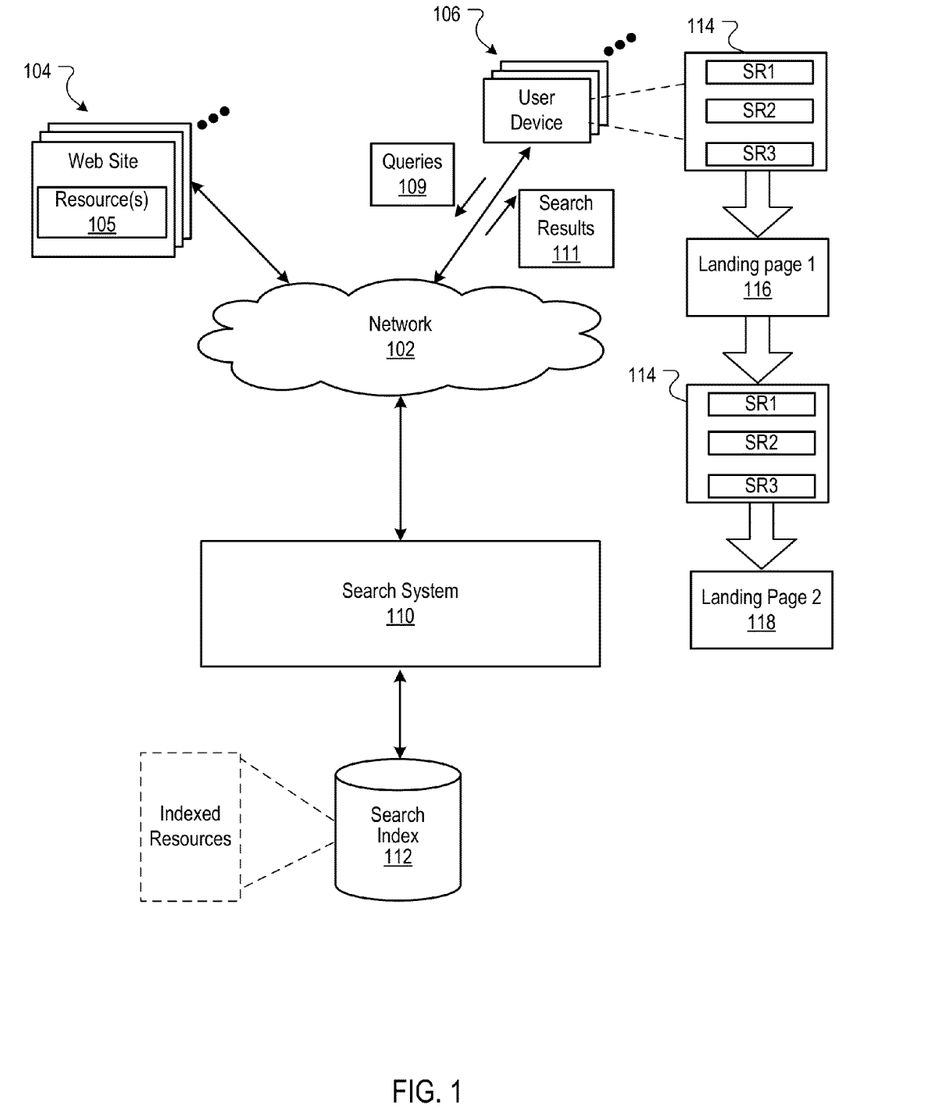
FIG. 1 is a block diagram of an example search environment.

FIG. 1 is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many thousands of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by a web site 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., scripts).

A user device 106 is an electronic device that is under control of a user and is capable of requesting and receiving resources 105 over the network 102. Example user devices 106 include personal computers, mobile communication devices, and other devices, such as tablet computing devices, that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 112.

The user devices 106 submit search queries 109 to the search system 110. In response, the search system 110 accesses the search index 112 to identify resources 105 that are relevant to (e.g., have at least a minimum specified relevance score for) the search query 109. The search system 110 identifies the resources 105, generates search results 111 that identify the resources 105, and returns the search results 111 to the user devices 106. A search result 111 is data generated by the search system 110 that identifies a resource 105 that is responsive to a particular search query, and includes a link to the resource 105. An example search result 111 can include a web page title, a snippet of text or a portion of an image extracted from the web page, and the URL of the web page.

The search results are ranked based, at least in part, on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on initial relevance scores that are a combination of the IR scores and page quality scores. The search results 111 are ordered according to these initial relevance scores and provided to the user device 106 according to the order.

The search results 111 (e.g., SR1, SR2, SR3) are presented in a search results page 114 that is displayed at the user device. User interaction a search result (e.g., SR1) causes the user device 106 to request a landing page (e.g., LP1) is referenced by the search result. In some implementations, the user device 106 submits a hypertext transfer protocol request for a resource that is located at a uniform resource locator specified by the search result with which the user interaction occurred. For example, user interaction with the search result SR1 can cause the user device 106 request landing page 1 (116) that is referenced by the search result SR1. In response to the request, data that cause presentation of landing page 1 (116) are received by the user device 106 and used to present landing page 1 (116) at the user device 106. In this example, the presentation of landing page 1 (116) may cause a search results page 114 to no longer be presented. For example, a browser that was presenting search results page 114 may present landing page 1 (116) in place of the results page 114.

In order to view additional landing pages for additional search results, a user can again request presentation of search results page 114, for example, by interacting with a "back" element is provided in their browser. Interaction with the "back" element will again cause presentation of the search results page 114, and the user can then interact with another search result, such as SR2, to request presentation of landing page 2 (118) that is referenced by the other search result. Similar interaction with the "back" element and additional search results can be iteratively performed to continue to view landing pages for additional search results. However, these iterative requests for landing pages and re-presentation of search results page 114 can be time-consuming, and make it difficult for a user to examine both the search results page 114 and a particular landing page at the same time.

User device 106 configured to present search results in one display pane, while presenting landing pages for the search results in another display pane. An interface that uses multiple panes to present search results and corresponding landing pages is referred to as a multi-pane search interface. The display pane in which the search results are presented is referred to as a results pane while the display pane in which the landing pages (and other content) are presented is referred to as a browsing pane. As described in more detail below, the browsing pane may be selectively presented in response to user interaction with a search result that is presented in the results pane, and a user may select a portion of the display that is occupied by the browsing pane. The user may view and/or interact with elements of the landing page that is displayed in the browsing pane, while presentation of the search results in the results pane is maintained (i.e., the search results page is not replaced by the landing page). Therefore, a user can request multiple different landing pages are referenced by the search results without submitting additional requests for the search result page (e.g., by interacting with a "back" element). An example multi-pane search interface is described with reference to FIGS. 2A-2D.

Figure 2A:
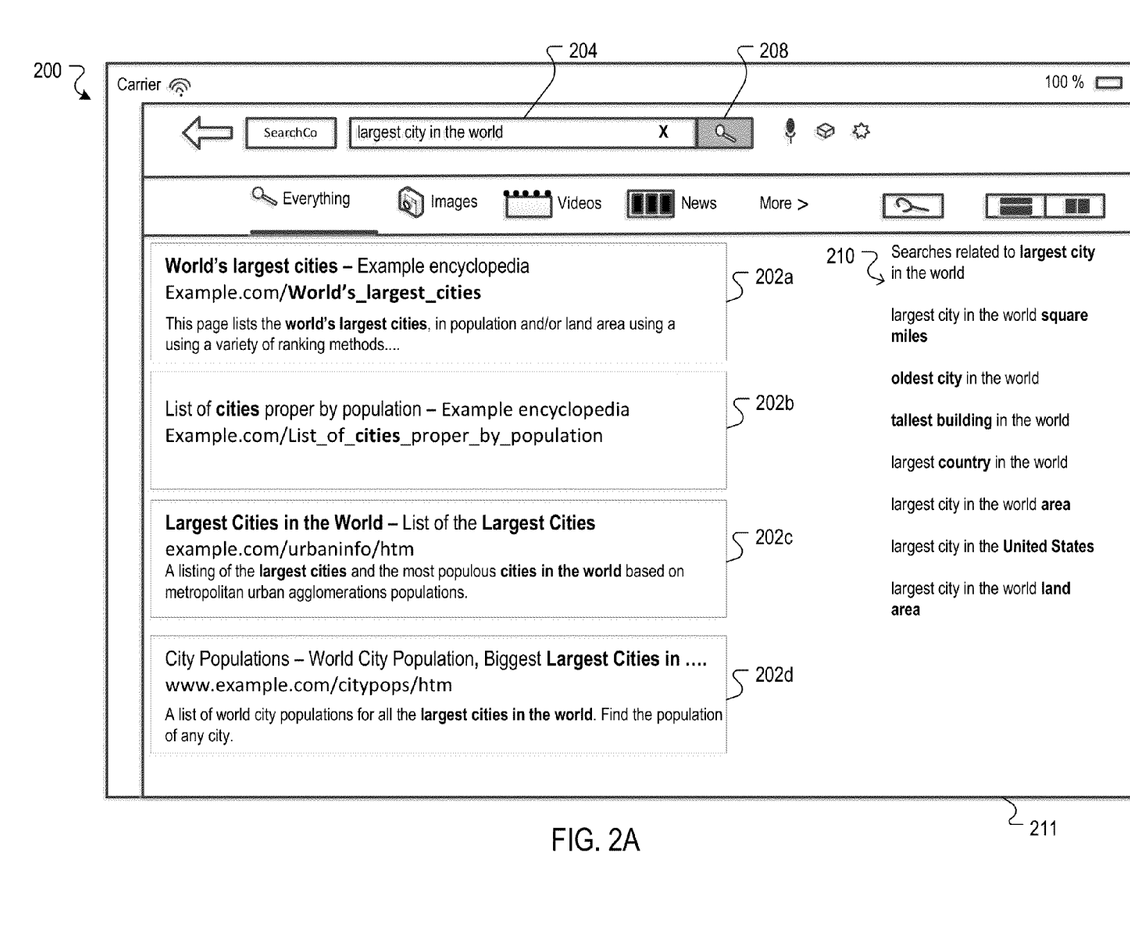
FIGS. 2A-2D are screen shots of an example user device display.

FIG. 2A is a screenshot of an example search interface 200 in which search results 202a-202d are presented. The search interface 200 can be presented at a user device, such as a tablet computing device. The search interface 200 includes a query entry field 204 in which a user can enter a search query 206. The user interface 200 also includes a search initiation element 208 with which the search query 206 be submitted to the search system. For example, in response to user interaction with the search initiation element 208 the user device can submit a search query to a search system as described above with reference to FIG. 1.

The search results 202a-202d that are presented in the search interface 200 are those search results that were received from the search system in response to submission of the search query 206. In some implementations, the search interface 200 can also include suggested search queries 210 that were received from search system. Suggested search queries 210 can be, for example, other search queries that the search system has identified (e.g., based on an analysis of search query logs) as potentially related to the search query 206. User interaction with one of the suggested search queries 210 can cause the user device to submit the suggested search query to the search system.

The search interface 200 that is illustrated by FIG. 2A includes only a single pane (e.g., a results pane 211). In some implementations, the search interface 200 is configured to present a results pane 211 in which the search results are presented, but not present a browsing pane until user interaction with a search result occurs. For example, upon receipt of search results 202a-202d from the search system, the user device can generate and/or populate a results pane 211 with the search results 202a-202d without generating and/or without populating a browsing pane. The dimensions of the results pane 211 can be selected to be substantially the same as (e.g., within a threshold distance of) the dimensions of the user device display. Alternatively, and/or additionally, the dimensions of the results pane 211 can be based, at least in part, on size preferences that have been specified in user preferences. For example, the user preferences can specify that the dimensions of the results pane are to be scaled by a factor of X (e.g., where X is a value less than 1.0) relative to the dimensions of the user device display.

Figure 2B:
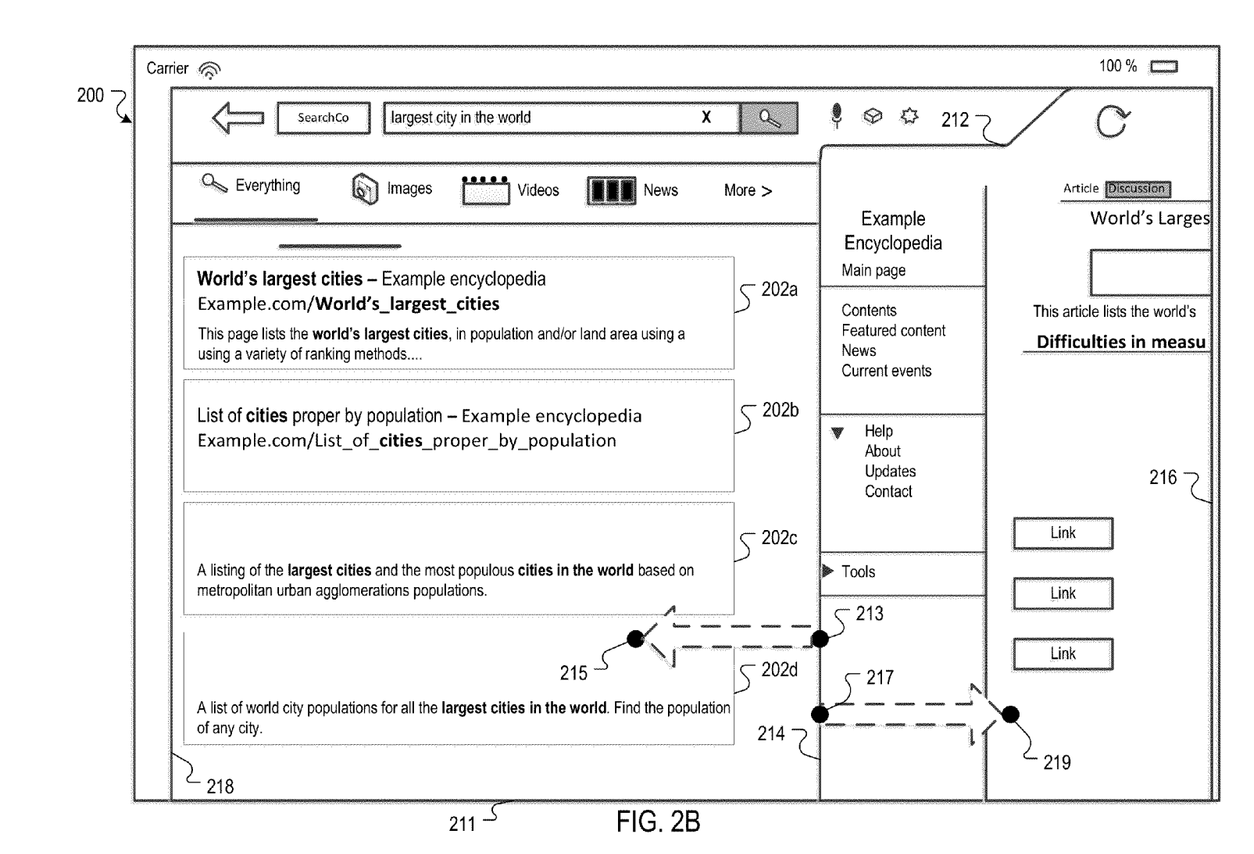

In response to detecting user interaction with one of the search results (e.g., search result 202a), the user device can generate and/or cause presentation of a browsing pane 212 in the search interface 200, as illustrated by FIG. 2B. User interaction with one of the search results can be detected, for example, based on detection of a pointer contacting a capacitive touch screen (or otherwise detecting interaction with another type of touch screen, such as an infrared touch screen or a pressure sensitive touch screen) at the presentation location of the search result. User interaction can also be detected based on a user positioning a graphic pointer (e.g., a mouse pointer) over the search result and "clicking" or otherwise selecting the search result.

The browsing pane 212 may be generated to have dimensions that are substantially the same as (or based on) the dimensions of the user device display (or a portion of that user device display that is available for presentation of resources). However, the portion of the browsing pane 212 that is presented may be less than the entire browsing pane. For example, as illustrated by FIG. 2B, a sub-portion (i.e., less than 100%) of the browsing pane 212 is presented over a portion of the results pane 211, and the portion of the results pane 211 is occluded by the sub-portion of the browsing pane 212. The sub-portion of the browsing pane 212 that is occluding the portion of the results pane 211 extends from a pane edge 214 of the browsing pane to an edge 216 of the user device display. That is, the portion of the user device display in which the browsing pane 212 is presented is bounded by the pane edge 214 and the edge 216 of the user device.

As discussed above, the browsing pane 212 can be used to present the landing page that is referenced by the search results (e.g., 202a) with which the user interaction occurred. For example, in response to detecting user interaction with search result 202a, the user device can submit a request for a landing page that is referenced (e.g., by way of a URL that is included in the search result) by the search result 202a. In turn, the user device receives data representing the landing page in response to the request, and can render the landing page using the received data. In turn, the user device can present at least a portion of the rendered landing page in the sub-portion of the browsing pane 212 that is presented in the user device display. For purposes of this document, the term landing page is used to refer to a resource that is requested in response to user interaction with a search result.

In some implementations, the portion of the landing page that is presented in the sub-portion of the browsing pane 212 can be that portion of the landing page that would be presented in the sub-portion of the browsing pane if all of the browsing pane 212 were presented in the user device display at 100% scale (or another scale). In some implementations, the landing page can be scaled so that at least a threshold portion (e.g., 40%) of the width of the landing page is presented in the browsing pane)

As discussed above, a pane edge 214 bounds the browsing pane 212, such that the portion of the results pane 211 is occluded by the browsing pane depends, at least in part, on a display location of the pane edge 214. In some implementations, the pane edge 214 can be positioned at an initial display location when the browsing pane is first presented following user interaction with a search result. The initial display location can be, for example, a display location at which less than half (or another specified portion such as more than half) of the results pane 211 is occluded by the browsing pane 212. For example, in FIG. 2B, the browsing pane 212 occludes less than half of the results pane 211, such that the browsing pane 212 does not occlude the titles of the search results 202a-202d. Therefore, the portions of the search results titles that were presented are still legible.

The search interface 200 can be implemented so that each of the results pane 211 and the browsing pane 212 maintain their relative positions and orientation independent of user interaction with the landing page that is presented in browsing pane 212 or user interaction with additional search results that are presented in the results pane 211. For example, user interaction with another search result 202b will cause the user device to request the landing page for search result 202b, but will not cause the browsing pane 212 to be occluded by the results pane 211. Rather, the visibility of the browsing pane 212 will be maintained and the user device will present the landing page for search results 202b in the browsing pane 212. By maintaining presentation of the browsing pane 212 following user interactions with additional search results, a user can sequentially select multiple search results to cause presentation of the corresponding landing pages in the browsing pane 212 without having to readjust the manner in which the panes are presented and also without being required to again submit a request for the search results page.

The browsing pane 212 can be implemented in a manner that enables a user to manipulate the location of the pane edge 214. In some implementations, the pane edge 214 is relocated based, at least in part, on a determination that a user swipe occurred. A user swipe is a user interaction that is determined to have occurred based on detection of a pointer at multiple locations along a path that extends from one display location to another display location. For purposes of illustration, a user swipe may be detected when a user places a finger (or another pointer) on a first location of a touch screen of a tablet computing device and slides the finger across the touch screen to a second location. In this example, the user device will detect the pointer at the first location and one or more additional points over the path between the first location and the second location. Thus, the user device can determine that a user swipe occurred.

Figure 2C:
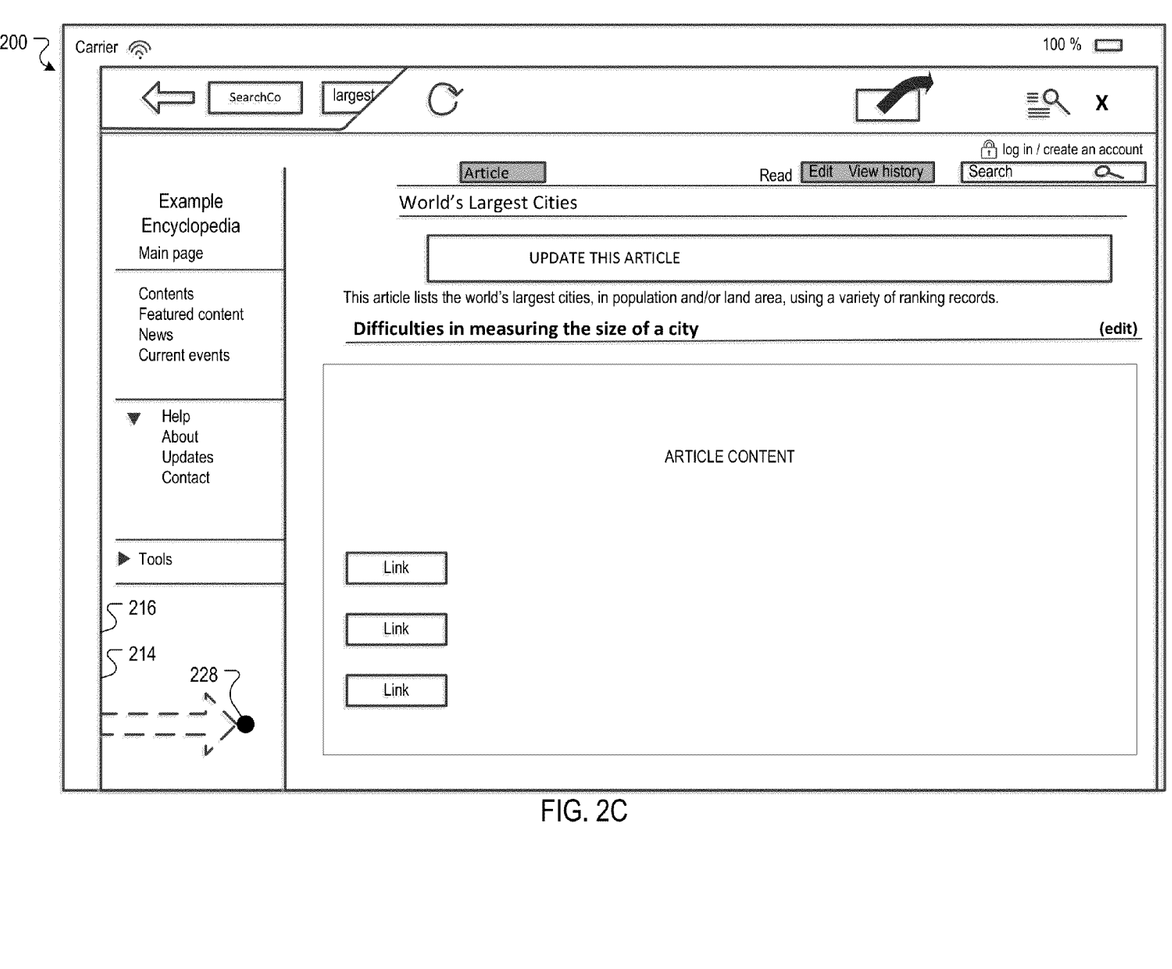
Figure 2D:
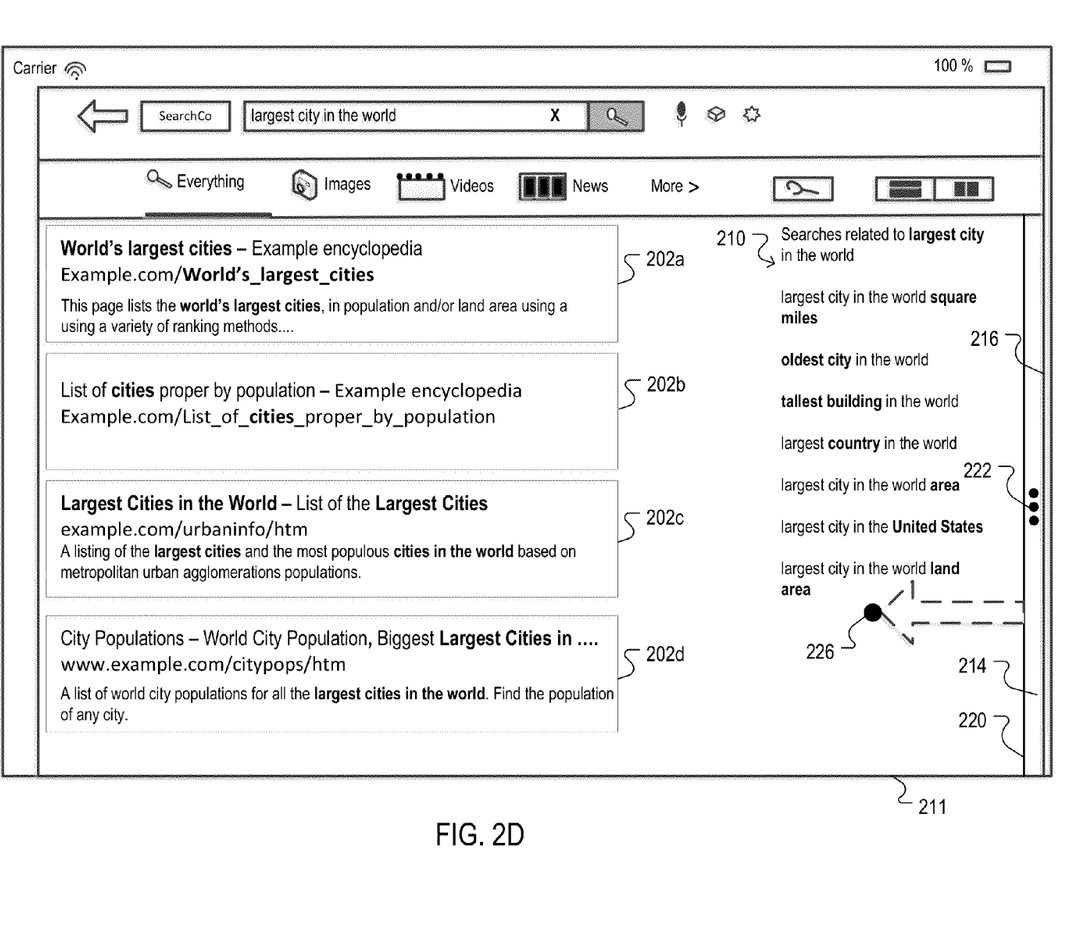

The location of the pane edge 214 can be relocated based, at least in part, on the direction of the user swipe. For example, if the user swipe travels along a path that begins at a location 213 near the pane edge 214 to a location 215 that is in the direction of display edge 218 (i.e., relative to the location of the pane edge 214) then the pane edge 214 can be relocated to a position that is closer to the display edge 218 (i.e., relative to a current location of the pane edge 214). In this example, as illustrated by FIG. 2C, the pane edge 214 can be relocated to a display position that is substantially the same (e.g., within a threshold number of pixels of) the display edge 218. Similarly, as illustrated by FIG. 2D, the pane edge 214 can be relocated to a display position that is substantially the same (e.g., within a threshold number of pixels of) the display edge 216 when the user swipe is along a path from a location 217 near the pane edge 214 to a location 219 that is closer to the display edge 216 (i.e., relative to the current location of the pane edge 214). The display location to which the pane edge 214 is relocated is referred to throughout this document as a target display location.

In some implementations, there are multiple possible target display locations to which the pane edge 214 can be relocated in response to a user swipe in a particular direction. For example, in addition to the initial display location, the search interface 200 can be implemented in a manner that enables the pane edge 214 to be relocated to a search view display location, a browsing view display location, and/or a partial view display location.

The search view display location is a target display location at which less than a threshold portion (e.g., less than 10%) of the results pane is occluded by the browsing pane. In some implementations, the search view display location is at (or within a threshold number of pixels of) an edge of the user device display. With reference to FIG. 2D, the pane edge 214 is located at the search view display location 220. In this example, the pane edge 214 is still visible and has increased in width to facilitate user interaction with the pane edge 214. The pane edge 214 has also been modified to include a grip element 222 that provides an indication of the ability to manipulate the location of the pane edge 214 through user interaction with (e.g., swiping near) the pane edge 214. As illustrated by FIG. 2D, when the pane edge 214 is located at the search view display location 220, the landing page that is presented in the browsing pane 212 may not be visible, while all of the text that is presented in the results pane 211 may be visible.

The browsing view display location is a target display location at which more than a threshold portion (e.g., 90%) of the results pane is occluded by the browsing pane. In some implementations, the browsing view display location is at (or within a threshold number of pixels of) an edge of the user device display. With reference to FIG. 2C, the pane edge 214 is located at the display edge 216, which in this example, is also the browsing view display location. As illustrated by FIG. 2C, the pane edge 214 is not visible when the pane edge 214 is at the browsing view display location, although in some implementations, the pane edge 214 could be implemented to remain visible irrespective of the location of the pane edge 214.

In some implementations, the browsing pane 214 can be implemented to have a "tab portion" 224 that is at least partially transparent so that a portion of the results pane 211 remains visible when the pane edge 214 is located at the browsing view display location. Additionally, the search interface 200 can be implemented such that user interaction with (e.g., a single or double tap or click of) the tab portion 224 will cause the pane edge 214 to be relocated to the search view display location 220, or otherwise cause a larger portion of the results pane 211 to be visible.

The partial view display location is a target display location that is located between the results view display location and the browsing view display location. At least a portion of the content that is presented in each of the results pane and the browsing pane is visible when the pane edge is located at a partial view display location. The location of the pane edge 214 in FIG. 2B is an example of a partial view display location. One or more additional partial view display locations can be specified so that the visible content in each of the results pane and the browsing pane can be varied.

The target display location to which the pane edge is relocated can be selected, at least in part, on a speed of the user swipe that has been detected. In some implementations, the pane edge is relocated to a closest target display location (e.g., that is in the direction of the user swipe) when the speed of the user swipe is less than a lower speed threshold. For example, with reference to FIG. 2D, assume that a user swipe has been detected from a location near the pane edge 214 to a location 226, and that the speed of the user swipe was determined to be less than the lower speed threshold. In this example, the pane edge 214 may be relocated to the next target display location that is to the left of the search view display location 220, which may result in the pane edge 214 being positioned as illustrated by FIG. 2B.

When the speed of the user swipe is determined to exceed an upper speed threshold, the pane edge can be relocated to either the browsing view display location or the search view display location depending on the direction of the user swipe. Continuing with the example above with reference to FIG. 2D, if the user swipe from the location near the pane edge 214 to the location 226 was determined to exceed the upper speed threshold, the user swipe can be considered to have satisfied a browsing view condition, for example, because the user swipe was in a direction of the browsing view display location, and the speed of the user swipe exceeded the upper speed threshold. When a user swipe satisfies the browsing view condition, the pane edge 214 is relocated to the browsing view display location, e.g., the display edge 216 in FIG. 2C.

When a user swipe is detected from a location near the browsing view display location (e.g., the display edge 216 in FIG. 2C) to a location 228 (i.e., in a direction of the results view display location), and the speed of the user swipe is determined to exceed the upper speed threshold, the user swipe is considered to have satisfied a results view condition. In response to determining that the user swipe satisfied the results view condition, the user device relocates the pane edge to the search view display location 220 as illustrated by FIG. 2D. If the user swipe that is in the direction of the results view display location does not exceed the upper speed threshold, the pane edge 214 can be relocated as illustrated by FIG. 2B.

When three target display locations are defined, as illustrated by FIGS. 2B-2D, the upper speed threshold and the lower speed threshold can have a same value. When additional target display locations have been specified, the values of the upper speed threshold and the lower speed threshold can differ, and additional speed thresholds can be specified. For example, each target display location can have a corresponding speed threshold that can vary based on the current location of the pane edge, such that the distance by which the pane edge is relocated can be proportional to the speed of the user swipe.

The speed of a user swipe can be determined based on an amount of time that elapses between detection of the pointer at two or more points along the swipe path. For example, assume that during a first user swipe the pointer is detected at a first location at time=0 and then detected at a second location at time=2, and that during a second user swipe the pointer is detected at the first location at time=4 and then detected at the second location at time=8. In this example, the duration of each swipe (and/or the distance between the points at which the pointer was detected) can be used to determine the speed of the swipe, and the second swipe will be determined to be ½ the speed of the first swipe.

Figure 3:
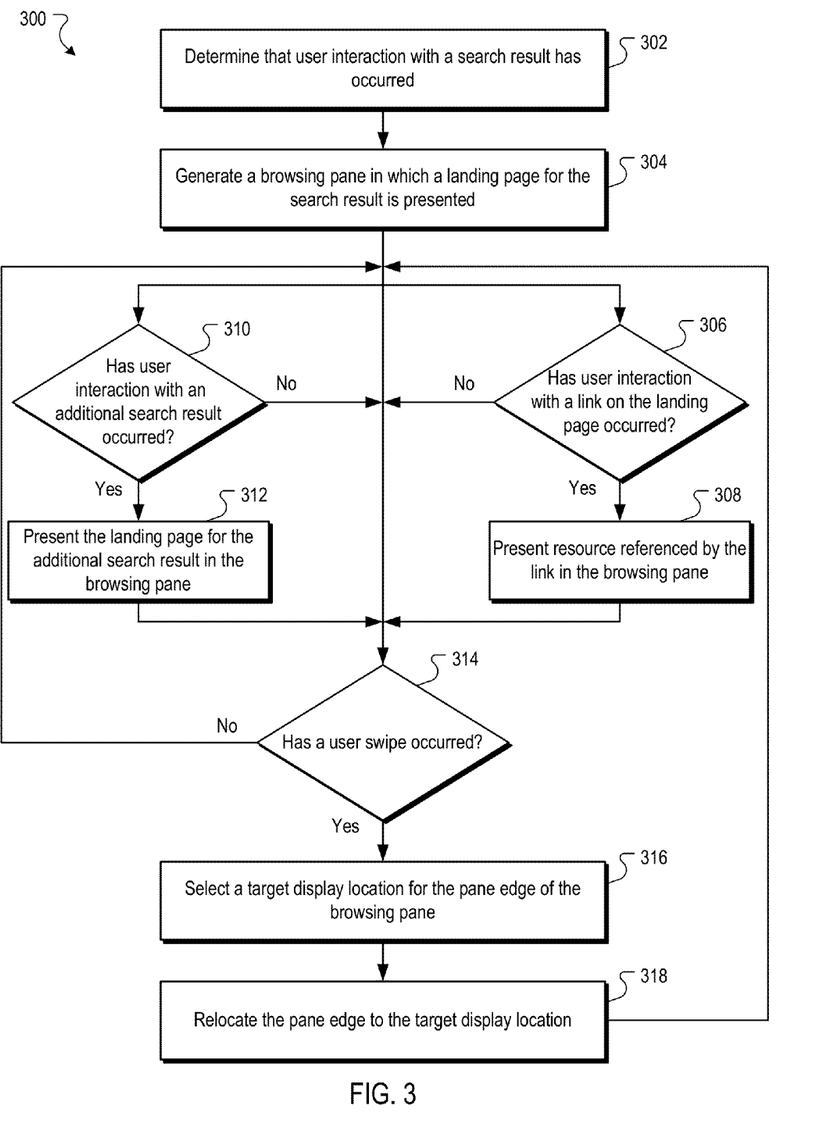
FIG. 3 is a flow chart of an example process for presenting content in a multi-pane interface.

FIG. 3 is a flow chart of an example process 300 for presenting content in a multi-pane interface. The process 300 can be implemented, for example, at a user device, such as a tablet computing device that includes a touch screen that receives input from a pointer such as a finger or a mechanical pointing device. The process can also be implemented by a desktop or other computing device that receives input from a pointer such as a mouse. The process 300 can also be implemented as instructions stored on computer storage medium such that execution of the instructions by data processing apparatus cause the data processing apparatus to perform the operations of the process 300.

User interaction with a search result is determined to have occurred (302). The search result with which the user interaction occurred can be presented in a results pane that is presented at a user device. The results pane can be, for example, a display area for a browser application in which search results are presented.

The user interaction can be detected by the user device that is presenting the search results. For example, as described above with reference to FIG. 2A, the user device can detect a pointer contacting a capacitive touch screen (or other interaction with another type of touch screen, such as an infrared touch screen or a pressure sensitive touch screen) at the presentation location of the search result. Additionally, the user device can detect a graphic pointer (e.g., a mouse pointer) being positioned over the search result and "clicking" or otherwise selecting the search result. The search result with which the user interaction occurred is referred to as a selected search result.

A browsing pane is generated in response to user interaction with the search result (304). In some implementations, the landing page for the selected search result is presented in the browsing pane. For example, in response to user interaction with the search result, the user device can request the landing page for the search result from a network location that is specified by the search result. Using the data received in response to the request, the user device can render the landing page and present at least a portion of the landing page in the browsing pane.

In some implementations, only a sub-portion of the browsing pane is initially presented. For example, as described above with reference to FIG. 2B, the portion of the browsing pane can be presented "over" a portion of the results pane (i.e., presented at a location that occludes a portion of the results pane) so that content from each of the results pane and the browsing pane are presented in the user device display. As described above, with reference to FIG. 2B, the portion of the browsing pane that is presented is bounded by a pane edge for the browsing pane and an edge of the user device display. Similarly, the portion of the results pane that is presented is bounded by the pane edge and another different edge of the user device display. Note that other portions (e.g., 0-100%) of the browsing pane can be initially presented.

A determination is optionally made whether a user interaction with a resource link on the landing page has occurred (306). User interaction with a resource link (e.g., a hypertext link to the resource) can be determined to have occurred in a similar manner that user interaction with a search result has occurred. In response to determining that user interaction with the resource link occurred, a resource that is referenced by the resource link can be presented in the browsing pane (308). For example, the user device can request the resource that is referenced by the resource, render the resource using the data that is received in response to the request, and presented at least a portion of the resource in the portion of the browsing pane that is visible in the user device display. The resource can be presented in the browsing pane while maintaining presentation of both the browsing pane and the results pane. For example, user interaction with the link may not affect the size and/or orientation of the browsing pane or the results pane.

A determination can also be optionally made whether a user interaction with an additional search result has occurred (310). The determination of whether user interaction with the additional search result can be made in parallel and/or independent of the determination of whether user interaction with the link occurred, and while the browsing pane is presented over the portion of the results pane. In response to determining that user interaction with an additional search result has occurred, the landing page for the additional search result can be presented in the browsing pane, as described above. The landing page can be presented in the browsing pane while maintaining presentation of both the browsing pane and the results pane. For example, user interaction with the additional search result may not affect the size and/or orientation of the browsing pane or the results pane.

A determination is also made whether a user swipe has occurred (314). The determination that the user swipe has occurred can be performed in parallel and/or independent of the previously discussed determinations. For example, the user device can continuously monitor whether user interaction has occurred and determine whether the user interaction constitutes a user swipe. As discussed above, a user swipe can be determined to have occurred based on detection of a pointer at multiple locations along a path that extends from a first display location to a second display location.

In some implementations, the determination of whether the user swipe has occurred can include a determination of whether the first display location is within a threshold distance of the display location at which the pane edge is presented. For example, if the pane edge is located at an initial display location (e.g., as illustrated by FIG. 2B), the determination can include determining that the user swipe begins at a location that is within a threshold number of pixels of the initial display location.

The determination of whether a user swipe has occurred can include determining a direction of the user swipe and/or a speed of the user swipe. The determination of the direction of the user swipe can be based on the sequential detection of the pointer at two or more points along the path. For example, if the pointer is first detected at a particular location of the user device display, and subsequently detected at another location of the user device display, the direction of the user swipe can be determined to be in a direction from the particular location to the other location. As described above in more detail, the speed of the user swipe can be determined based on an amount of time between detection of the pointer at two or more points along the path.

In response to determining that a user swipe has occurred, a target display location of the pane edge of the browsing pane is selected (316). In some implementations, the target display location is selected based, at least in part, on the current location of the pane edge, the direction of the user swipe, and/or the speed of the user swipe. For example, if the pane edge is located at the initial display location (e.g., as illustrated by FIG. 2B), the target display location that is selected can be in a direction of the swipe (i.e., relative to the position of the pane edge). If the swipe is in the direction of the results view display location, then the results view display location can be selected as the target display location. Alternatively, if the swipe is in the direction of the browser view display location, then the browser view display location can be selected as the target display location.

When multiple target display locations are in a same direction as the user swipe, selection of the target display location can be further based on the speed of the user swipe. For example, as described above, speed thresholds can be specified and distance between a current location of the pane edge and the target display location that is selected can be based on which, if any, of the speed thresholds that are exceeded. In some implementations, the distance between the current location of the pane edge and the target display location that is selected is proportional to the speed of the user swipe.

As discussed above, view conditions can be used to determine which target display location is selected. For example, when a browsing view condition is satisfied, the browsing view display location is selected as the target display location irrespective of the current location of the pane edge. Satisfaction of the browsing view display location can require, for example, that the user swipe be in the direction of the edge of the user device display at which the browsing view display location is located and also require that the speed of the user swipe exceed an upper speed threshold.

When a results view condition is satisfied, the results view display location can be selected as the target display location irrespective of the current location of the pane edge. Satisfaction of the results view condition can require, for example, that the user swipe be in the direction of the edge of the user device display at which the results view display location is located and also require that the speed of the user swipe exceed an upper speed threshold.

The pane edge is relocated to the target display location (318). Relocation of the pane edge causes the portion of the results pane over which the browsing pane is presented to be adjusted. For example, as the location of the selected target display location approaches the results view display location, the portion of the results pane that is occluded is reduced and the portion of the browsing pane that is presented in the user device display is also reduced. As the location of the selected target display location approaches the browsing view display location, the portion of the results pane that is occluded increases as does the portion of the browsing pane that is presented in the user device display.

Figure 4:
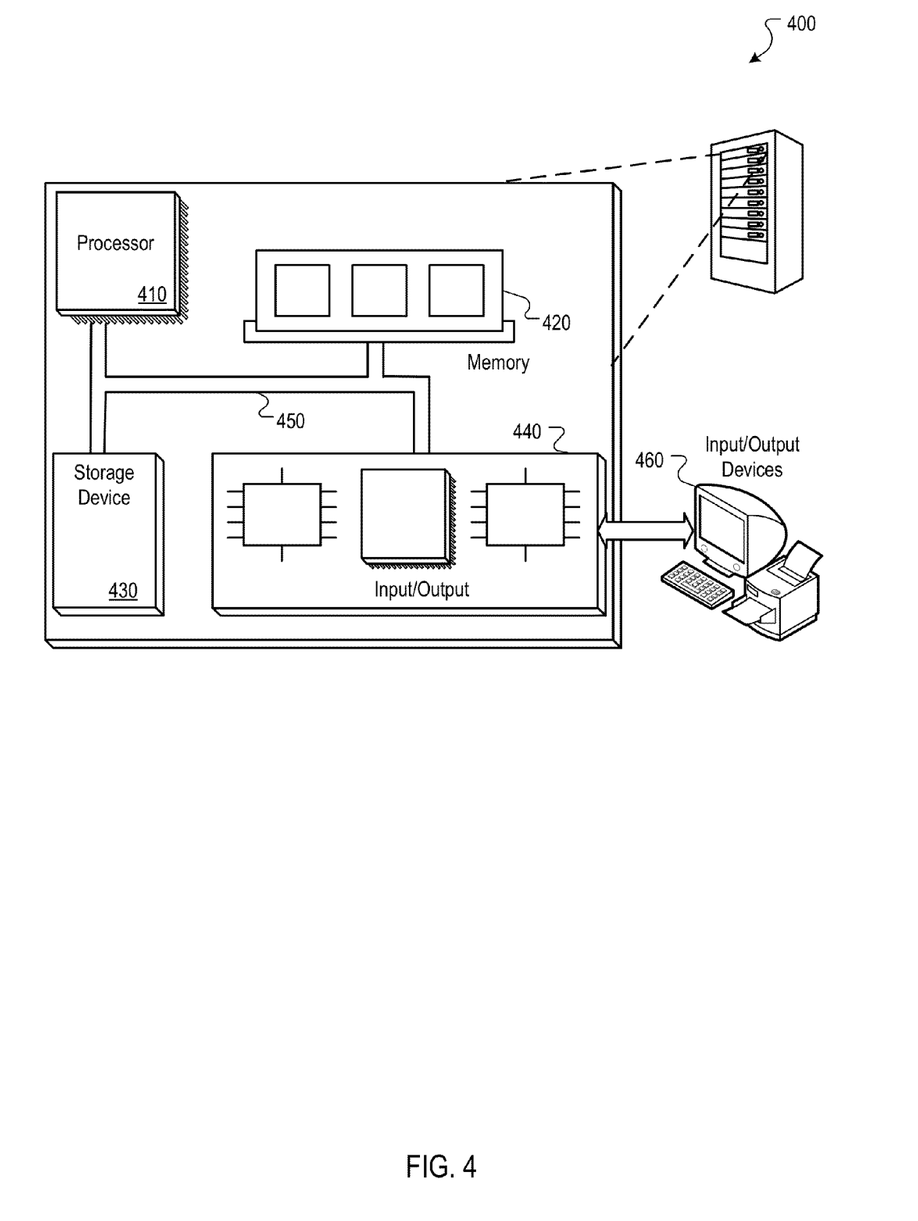
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460.

Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   determining that user interaction with a search result presented in a results pane of a display has occurred;
   generating a browsing pane in which a landing page for the search result is presented, the browsing pane being located over a portion of the results pane, the portion of the results pane being bounded by an edge of the display and a pane edge of the browsing pane, the pane edge being located at an initial display location;
   determining that a user swipe has occurred, the determination that the user swipe has occurred being based, at least in part, on detection of a pointer at multiple locations along a path that extends from a first display location to a second display location, the first display location being within a threshold distance of the initial display location;
   in response to determining that the user swipe has occurred:
     comparing a speed of the user swipe to swipe speed thresholds for multiple different predefined target display locations, wherein a first swipe speed threshold for a first predefined target display location is lower than a second swipe speed threshold for a second predefined target display location that is farther away from a current display location than the first predefined target display location; and
     relocating, based on the comparing, the pane edge to a given predefined target display location, from among the first predefined target display location and the second predefined target display location, based on a higher of the first swipe speed threshold or the second swipe speed threshold that is met or exceeded by the swipe speed of the user swipe.

2. The method of claim 1, further comprising:
   detecting, while the browsing pane is presented over the portion of the results pane, an additional user interaction with an additional search result that is presented in the results pane;
   in response to detecting the additional user interaction:
     maintaining presentation of the browsing pane over the portion of the results pane; and
     presenting a landing page for the additional search result in the browsing pane.

3. The method of claim 2, further comprising:
   determining that the user interaction with a resource link occurred, the resource link being a link that is included in the landing page for the additional search result; and
   in response to determining that the user interaction with the resource link occurred:
     requesting a resource that is referenced by the resource link; and
     presenting the resource in the browsing pane, the resource being presented while maintaining presentation of at least one search result in the results pane.

4. The method of claim 1, further comprising:
   determining a direction of the user swipe, the direction of the user swipe being based on sequential detection of the pointer at two or more of the multiple points; and
   selecting the predefined target display location based, at least in part, on the initial display location and the direction of the user swipe.

5. The method of claim 4, further comprising determining a speed of the user swipe, a speed of the user swipe being based on an amount of time between detection of the pointer at two or more of the multiple points, wherein the predefined target display location is further selected based, at least in part, on the speed of the user swipe.

6. The method of claim 5, wherein a distance between the predefined target display location and the initial display location is proportional to the speed of the user swipe.

7. The method of claim 5, wherein selecting the predefined target display location comprises selecting the predefined target display location from a plurality of candidate display locations that includes at least:

a results view display location that is located at a first edge of the display and causes less than a threshold portion of the results pane to be occluded by the browsing pane;
a browsing view display location that is located at a second edge of the display and causes more than a threshold portion of the results pane to be occluded by the browsing pane, the second edge being located on an opposite end of the display than the first edge; and
a partial view display location that is located between the first edge and the second edge.

8. The method of claim 7, further comprising:
determining that the pane edge is located at the results view display location;
determining that a browsing view condition has been satisfied, the determination that the browsing view condition is satisfied being based, at least in part, on the direction of the user swipe being towards the second edge of the display and that the speed of the user swipe being greater than a speed threshold; and
in response to determining that the browsing view condition has been satisfied, relocating the pane edge to the browsing view display location.

9. The method of claim 8, further comprising:
determining that a subsequent user swipe has occurred while the pane edge is located at the browsing view display location;
determining that the subsequent user swipe satisfies a results view condition, the determination that the results view condition is satisfied being based, at least in part, on a direction of a subsequent user swipe being toward the results view display location and a speed of the subsequent user swipe being greater than the speed threshold; and
in response to determining that the results view condition has been satisfied, relocating the pane edge to the results view display location.

10. A non-transitory computer storage medium encoded with a computer program, the program comprising instructions that when executed by data processing apparatus cause the data processing apparatus to perform operations comprising:
determining that user interaction with a search result presented in a results pane of a display has occurred;
generating a browsing pane in which a landing page for the search result is presented, the browsing pane being located over a portion of the results pane, the portion of the results pane being bounded by an edge of the display and a pane edge of the browsing pane, the pane edge being located at an initial display location;
determining that a user swipe has occurred, the determination that the user swipe has occurred being based, at least in part, on detection of a pointer at multiple locations along a path that extends from a first display location to a second display location, the first display location being within a threshold distance of the initial display location;
in response to determining that the user swipe has occurred:
comparing a speed of the user swipe to swipe speed thresholds for multiple different predefined target display locations, wherein a first swipe speed threshold for a first predefined target display location is lower than a second swipe speed threshold for a second predefined target display location that is farther away from a current display location than the first predefined target display location; and
relocating, based on the comparing, the pane edge to a given predefined target display location from among the first predefined target display location and the second predefined target display location based on a higher of the first swipe speed threshold or the second swipe speed threshold that is met or exceeded by the swipe speed of the user swipe.

11. The non-transitory computer storage medium of claim 10, wherein the program includes instructions that when executed by the data processing apparatus cause the data processing apparatus to perform operations further comprising:
detecting, while the browsing pane is presented over the portion of the results pane, an additional user interaction with an additional search result that is presented in the results pane;
in response to detecting the additional user interaction:
maintaining presentation of the browsing pane over the portion of the results pane; and
presenting a landing page for the additional search result in the browsing pane.

12. The non-transitory computer storage medium of claim 11, wherein the program includes instructions that when executed by the data processing apparatus cause the data processing apparatus to perform operations further comprising:
determining that the user interaction with a resource link occurred, the resource link being a link that is included in the landing page for the additional search result; and
in response to determining that the user interaction with the resource link occurred:
requesting a resource that is referenced by the resource link; and
presenting the resource in the browsing pane, the resource being presented while maintaining presentation of at least one search result in the results pane.

13. The non-transitory computer storage medium of claim 10, wherein the program includes instructions that when executed by the data processing apparatus cause the data processing apparatus to perform operations further comprising:
determining a direction of the user swipe, the direction of the user swipe being based on sequential detection of the pointer at two or more of the multiple points; and
selecting the predefined target display location based, at least in part, on the initial display location and the direction of the user swipe.

14. The non-transitory computer storage medium of claim 13, wherein the program includes instructions that when executed by the data processing apparatus cause the data processing apparatus to perform operations further comprising determining the speed of the user swipe, the speed of the user swipe being based on an amount of time between detection of the pointer at two or more of the multiple points, wherein the predefined target display location is further selected based, at least in part, on the speed of the user swipe.

15. The non-transitory computer storage medium of claim 14, wherein a distance between the predefined target display location and the initial display location is proportional to the speed of the user swipe.

16. The non-transitory computer storage medium of claim 14, wherein selecting the predefined target display location comprises selecting the predefined target display location from a plurality of candidate display locations that includes at least:
a results view display location that is located at a first edge of the display and causes less than a threshold portion of the results pane to be occluded by the browsing pane;

a browsing view display location that is located at a second edge of the display and causes more than a threshold portion of the results pane to be occluded by the browsing pane, the second edge being located on an opposite end of the display than the first edge; and a partial view display location that is located between the first edge and the second edge.

17. The non-transitory computer storage medium of claim 16, wherein the program includes instructions that when executed by the data processing apparatus cause the data processing apparatus to perform operations further comprising:

determining that the pane edge is located at the results view display location;

determining that a browsing view condition has been satisfied, the determination that the browsing view condition is satisfied being based, at least in part, on the direction of the user swipe being towards the second edge of the display and that the speed of the user swipe being greater than a speed threshold; and in response to determining that the browsing view condition has been satisfied, relocating the pane edge to the browsing view display location.

18. The non-transitory computer storage medium of claim 17, wherein the program includes instructions that when executed by the data processing apparatus cause the data processing apparatus to perform operations further comprising:

determining that a subsequent user swipe has occurred while the pane edge is located at the browsing view display location;

determining that the subsequent user swipe satisfies a results view condition, the determination that the results view condition is satisfied being based, at least in part, on a direction of a subsequent user swipe being toward the results view display location and a speed of the subsequent user swipe being greater than the speed threshold; and in response to determining that the results view condition has been satisfied, relocating the pane edge to the results view display location.

19. A system comprising:

a display in which search results are presented;

one or more processors configured to determine that user interaction with the display has occurred, the one or more processors further configured to perform operations comprising:

determining that the user interaction with a search result presented the search result in a results pane of the display;

generating a browsing pane in which a landing page for the search result is presented, the browsing pane being located over a portion of the results pane, the portion of the results pane being bounded by an edge of the display and a pane edge of the browsing pane, the pane edge being located at an initial display location;

determining that a user swipe has occurred, the determination that the user swipe has occurred being based, at least in part, on detection of a pointer at multiple locations along a path that extends from a first display location to a second display location, the first display location being within a threshold distance of the initial display location;

in response to determining that the user swipe has occurred:

comparing a speed of the user swipe to swipe speed thresholds for multiple different predefined target display locations, wherein a first swipe speed threshold for a first predefined target display location is lower than a second swipe speed threshold for a second predefined target display location that is farther away from a current display location than the first predefined target display location; and relocating, based on the comparing, the pane edge to a given predefined target display location from among the first predefined target display location and the second predefined target display location based on a higher of the first swipe speed threshold or the second swipe speed threshold that is met or exceeded by the swipe speed of the user swipe.

20. The system of claim 19, wherein the one or more processors are configured to perform operations further comprising:

detecting, while the browsing pane is presented over the portion of the results pane, an additional user interaction with an additional search result that is presented in the results pane;

in response to detecting the additional user interaction:

maintaining presentation of the browsing pane over the portion of the results pane; and presenting a landing page for the additional search result in the browsing pane.

21. The system of claim 20, wherein the one or more processors are configured to perform operations further comprising:

determining that the user interaction with a resource link occurred, the resource link being a link that is included in the landing page for the additional search result; and in response to determining that the user interaction with the resource link occurred:

requesting a resource that is referenced by the resource link; and presenting the resource in the browsing pane, the resource being presented while maintaining presentation of at least one search result in the results pane.

22. The system of claim 19, wherein the one or more processors are configured to perform operations further comprising:

determining a direction of the user swipe, the direction of the user swipe being based on sequential detection of the pointer at two or more of the multiple points; and selecting the predefined target display location based, at least in part, on the initial display location and the direction of the user swipe.

23. The system of claim 22, wherein the one or more processors are configured to perform operations further comprising determining the speed of the user swipe, the speed of the user swipe being based on an amount of time between detection of the pointer at two or more of the multiple points, wherein the predefined target display location is further selected based, at least in part, on the speed of the user swipe.

24. The system of claim 23, wherein a distance between the predefined target display location and the initial display location is proportional to the speed of the user swipe.

25. The system of claim 23, wherein selecting the predefined target display location comprises selecting the predefined target display location from a plurality of candidate display locations that includes at least:

a results view display location that is located at a first edge of the display and causes less than a threshold portion of the results pane to be occluded by the browsing pane;

a browsing view display location that is located at a second edge of the display and causes more than a threshold portion of the results pane to be occluded by the browsing pane, the second edge being located on an opposite end of the display than the first edge; and a partial view display location that is located between the first edge and the second edge.

26. The system of claim 25, wherein the one or more processors are configured to perform operations further comprising:

determining that the pane edge is located at the results view display location;

determining that a browsing view condition has been satisfied, the determination that the browsing view condition is satisfied being based, at least in part, on the direction of the user swipe being towards the second edge of the display and that the speed of the user swipe being greater than a speed threshold; and in response to determining that the browsing view condition has been satisfied, relocating the pane edge to the browsing view display location.

27. The system of claim 26, wherein the one or more processors are configured to perform operations further comprising:

determining that a subsequent user swipe has occurred while the pane edge is located at the browsing view display location;

determining that the subsequent user swipe satisfies a results view condition, the determination that the results view condition is satisfied being based, at least in part, on a direction of a subsequent user swipe being toward the results view display location and a speed of the subsequent user swipe being greater than the speed threshold; and in response to determining that the results view condition has been satisfied, relocating the pane edge to the results view display location.

* * * * *